US010514542B2

(12) United States Patent
Erinjippurath et al.

(10) Patent No.: US 10,514,542 B2
(45) Date of Patent: Dec. 24, 2019

(54) HEAD-MOUNTED DISPLAY

(71) Applicant: DOLBY LABORATORIES LICENSING CORPORATION, San Francisco, CA (US)

(72) Inventors: Gopal Erinjippurath, San Francisco, CA (US); Andrew Healy, San Francisco, CA (US); Thao D. Hovanky, San Francisco, CA (US); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 919 days.

(21) Appl. No.: 14/365,926

(22) PCT Filed: Dec. 12, 2012

(86) PCT No.: PCT/US2012/069213
§ 371 (c)(1),
(2) Date: Jun. 16, 2014

(87) PCT Pub. No.: WO2013/096052
PCT Pub. Date: Jun. 27, 2013

(65) Prior Publication Data
US 2015/0002374 A1 Jan. 1, 2015

Related U.S. Application Data

(60) Provisional application No. 61/577,457, filed on Dec. 19, 2011.

(51) Int. Cl.
*G02B 27/01* (2006.01)
*H04N 13/344* (2018.01)
(Continued)

(52) U.S. Cl.
CPC .......... *G02B 27/0172* (2013.01); *G06T 11/00* (2013.01); *G06T 15/08* (2013.01);
(Continued)

(58) Field of Classification Search
CPC .. G06F 3/011; G06F 17/30589; H04L 63/104; H04L 61/1552; H04L 61/1523
See application file for complete search history.

(56) References Cited

U.S. PATENT DOCUMENTS 4,406,532 A 9/1983 Howlett
4,877,320 A * 10/1989 Holden ..................... A61F 9/02
351/44
(Continued)

FOREIGN PATENT DOCUMENTS

CN 1578923 2/2005
CN 101595422 12/2009
(Continued)

OTHER PUBLICATIONS

CES 2011, "Hands-on with Sony's Personal 3D Viewer".
(Continued)

*Primary Examiner* — David Tung

(57) ABSTRACT

Several embodiments of a personal display systems that comprises modular and extensible features to affect a range of user/wearer/viewer experiences. In one embodiment, the personal display system comprises a frame, said frame formed to fit and mount the head of a viewer; at least one optical piece, said at least one optical piece comprising at least a portion of a plurality of active emissive elements; at least one side piece, said side piece capable of being mated to said frame; and further wherein at least one said side piece comprising components sufficient to interact with images intended to comprise a view of said viewer. In another embodiment, a front piece may be mated to the frame of the
(Continued)

personal display system wherein such front piece may comprise a transmissive portion affecting some form of modulation of the light being transmitted there through.

17 Claims, 13 Drawing Sheets

(51) Int. Cl.
G06T 11/00 (2006.01)
G06T 15/08 (2011.01)
(52) U.S. Cl.
CPC ... *H04N 13/344* (2018.05); *G02B 2027/0123* (2013.01); *G02B 2027/0178* (2013.01); *H04N 2213/001* (2013.01); *H04N 2213/008* (2013.01)

(56) References Cited

U.S. PATENT DOCUMENTS

| | | | |
|---|---|---|---|
| 5,162,828 A | 11/1992 | Furness | |
| 5,742,264 A | 4/1998 | Inagaki | |
| 5,867,134 A * | 2/1999 | Alvelda | G02B 27/017 345/205 |
| 6,097,543 A * | 8/2000 | Rallison | G02B 27/0172 359/630 |
| 6,204,974 B1 | 3/2001 | Spitzer | |
| 6,384,982 B1 | 5/2002 | Spitzer | |
| 6,388,797 B1 | 5/2002 | Lipton | |
| 6,618,099 B1 | 9/2003 | Spitzer | |
| 7,249,846 B2 | 7/2007 | Grand | |
| 7,417,617 B2 | 8/2008 | Eichenlaub | |
| 7,499,217 B2 | 3/2009 | Cakmakci | |
| 8,403,489 B2 | 3/2013 | Richards | |
| 8,411,137 B2 | 4/2013 | Jacobs | |
| 8,459,796 B2 | 6/2013 | Richards | |
| 8,503,078 B2 | 8/2013 | Richards | |
| 8,537,463 B2 | 9/2013 | Richards | |
| 2005/0174470 A1 * | 8/2005 | Yamasaki | G02B 27/017 348/345 |
| 2005/0174651 A1 | 8/2005 | Spitzer | |
| 2006/0018027 A1 * | 1/2006 | Yamasaki | G02B 27/017 359/631 |
| 2006/0023158 A1 * | 2/2006 | Howell | G02C 11/06 351/41 |
| 2006/0244897 A1 * | 11/2006 | Guenther | G02C 5/10 351/43 |
| 2007/0046887 A1 * | 3/2007 | Howell | G02C 5/143 351/41 |
| 2007/0069976 A1 | 3/2007 | Willins | |
| 2009/0174612 A1 * | 7/2009 | Ayala | H01Q 1/2266 343/702 |
| 2009/0231687 A1 * | 9/2009 | Yamamoto | G02B 26/101 359/359 |
| 2010/0060857 A1 | 3/2010 | Richards | |
| 2010/0245585 A1 | 9/2010 | Fisher | |
| 2011/0075257 A1 * | 3/2011 | Hua | G02B 27/017 359/464 |
| 2011/0213664 A1 * | 9/2011 | Osterhout | G02B 27/017 705/14.58 |
| 2011/0221793 A1 | 9/2011 | King, III | |
| 2011/0248904 A1 * | 10/2011 | Miyawaki | G02B 27/017 345/7 |

FOREIGN PATENT DOCUMENTS

| | | |
|---|---|---|
| CN | 201903695 | 7/2011 |
| CN | 102213832 | 10/2011 |
| WO | 2011/015669 | 2/2011 |

OTHER PUBLICATIONS

Yu, N. et al "Light Propagation with Phase Discontinuities: Generalized Laws of Reflection and Refraction" published in Science Magazine, vol. 334, Oct. 22, 2011.

* cited by examiner $$\sin(\theta_t)n_t - \sin(\theta_i)n_i = \frac{\lambda_0}{2\pi}\frac{d\Phi}{dx}$$

HEAD-MOUNTED DISPLAY

CROSS-REFERENCE TO RELATED APPLICATIONS

This application claims priority to U.S. Provisional patent application No. 61/577,457 filed 19 Dec. 2011, which is hereby incorporated by reference in its entirety.

TECHNICAL FIELD

The present invention relates to displays systems and, more particularly, to novel personal display systems comprising versatile and extensible features.

BACKGROUND

In the field of wearable personal glasses, it is known to create personal 3D displays comprising glasses that affect a 3D viewing experience—either leveraging polarization effects, spectral separation effects, or the like. Such personal displays are disclosed further in co-owned: (1) United States Patent Application Publication Number 20100060857 entitled "SYSTEM FOR 3D IMAGE PROJECTIONS AND VIEWING"; (2) United States Patent Application Publication Number 20100066976 entitled "METHOD AND SYSTEM FOR SHAPED GLASSES AND VIEWING 3D IMAGES"; (3) United States Patent Application Publication Number 20100067108 entitled "METHOD AND SYSTEM FOR SHAPED GLASSES AND VIEWING 3D IMAGES"; (4) United States Patent Application Publication Number 20100073769 entitled "METHOD AND SYSTEM FOR SHAPED GLASSES AND VIEWING 3D IMAGES"; (5) United States Patent Application Publication Number 20110205494 entitled "SPECTRAL SEPARATION FILTERS FOR 3D STEREOSCOPIC D-CINEMA PRESENTATION"; (6) United States Patent Application Publication Number 20100013911 entitled "DUAL PROJECTION SYSTEM WITH INVERSELY SYNCHRONIZED CHANNEL PROJECTIONS"—all of which are hereby incorporated by reference in their entirety.

Other references to personal head mounted displays are known such as: (1) United States Patent Application Publication Number 20110248904 entitled "HEAD MOUNTED DISPLAY AND OPTICAL POSITION ADJUSTMENT METHOD OF THE SAME"; (2) United States Patent Application Publication Number 20110221793 entitled "ADJUSTABLE DISPLAY CHARACTERISTICS IN AN AUGMENTED REALITY EYEPIECE"; (3) U.S. Pat. No. 6,204,974 entitled "COMPACT IMAGE DISPLAY SYSTEM FOR EYEGLASSES OR OTHER HEAD-BORNE FRAMES"; (4) United States Patent Application Publication Number 20050174651 entitled "BINOCULAR VIEWING SYSTEM"; (5) United States Patent Application Publication Number 20070069976 entitled "METHOD AND SYSTEM FOR INTERFACE BETWEEN HEAD MOUNTED DISPLAY AND HANDHELD DEVICE"; (6) U.S. Pat. No. 5,742,264 entitled "HEAD-MOUNTED DISPLAY"; (7) United States Patent Application Publication Number 20100245585 entitled "HEADSET-BASED TELECOMMUNICATIONS PLATFORM"; (8) U.S. Pat. No. 6,388,797 entitled "ELECTROSTEREOSCOPIC EYEWEAR"; (9) U.S. Pat. No. 6,097,543 entitled "PERSONAL VISUAL DISPLAY"; (10) U.S. Pat. No. 6,384,982 entitled "COMPACT IMAGE DISPLAY SYSTEM FOR EYEGLASSES OR OTHER HEAD-BORNE FRAMES"; (11) U.S. Pat. No. 6,618,099 entitled "DISPLAY DEVICE WITH EYEPIECE ASSEMBLY AND DISPLAY ON OPTO-MECHANICAL SUPPORT"; (12) U.S. Pat. No. 7,499,217 entitled "IMAGING SYSTEMS FOR EYEGLASS-BASED DISPLAY DEVICES"; (13) U.S. Pat. No. 5,162,828 entitled "DISPLAY SYSTEM FOR A HEAD MOUNTED VIEWING TRANSPARENCY"; (14) U.S. Pat. No. 7,249,846 entitled "EYEWEAR WITH AN IMAGE PROJECTED OFF OF AN UNASSISTED EYEWEAR LENS TO THE USER"—all of which are herein incorporated by reference in their entirety.

SUMMARY

Several embodiments of display systems and methods of their manufacture and use are herein disclosed.

In one embodiment, a personal display system comprises a one or more modular parts wherein such modularity affects a wide range of user/wearer/viewer experiences.

In one embodiment, the personal display system comprises a frame, said frame formed to fit and mount the head of a viewer; at least one optical piece, said at least one optical piece comprising at least a portion of a plurality of active emissive elements; at least one side piece, said side piece capable of being mated to said frame; and further wherein at least one said side piece comprising components sufficient to interact with images intended to comprise a view of said viewer.

In another embodiment, a front piece may be mated to the frame of the personal display system wherein such front piece may comprise a transmissive portion affecting some form of modulation of the light being transmitted there through Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

In the field of wearable personal display systems, some such display systems affect a 2D image on the glasses—to cover either the entire field of view or some portion thereof. Other such display systems affect a 3D image as light is transmitted through the glasses having some state—e.g. polarization or spectral separation or the like—that may be leveraged to produce such 3D effects.

In one embodiment of the present application, a head-mounted personal display system is disclosed. This embodiment comprises a head-wearable frame that provides a versatile, extensible frame and/or structure by which at least one side piece, different lenses and/or front pieces may be added, mated, changed, swapped or otherwise replaced to affect images presented to the user via a emissive display—or a transmissive portion with possibly polarization or spectral separation features for the presentation of 3D effects.

Other optional features are disclosed in other embodiments. For example, one such embodiment of a display system may comprise a pair of detachable displays (one for each eye, right and left), a head wear frame, audio/video modules, wireless communication unit and power electronics.

Figure 1:
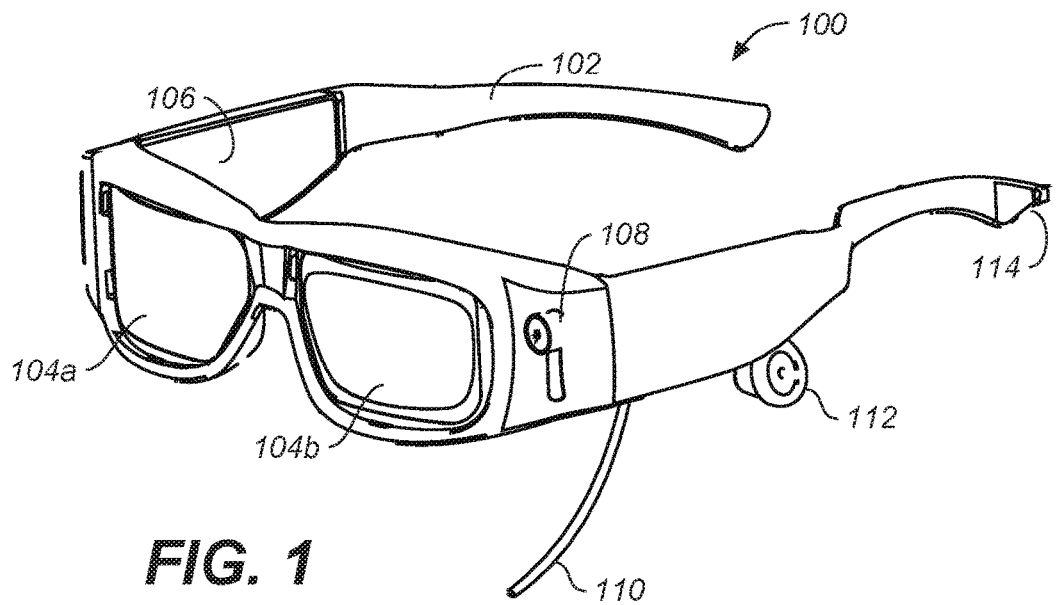
FIG. 1 shows one embodiment of a personal display system made in accordance with the principles of the present application.

FIG. 1 shows one embodiment of a head-mounted personal display system 100. Display system 100 may comprise frame 102, a pair of optical pieces (and/or displays) 104a and 104b, compartment 106, camera sensor 108, microphone (MIC) 110, earphone 112, proximate sensor 114. As will be explained in greater detail below, the present application encompasses a number and variety of embodiments of such display systems—e.g., with some functional blocks optional and other functional blocks additional to the embodiment shown in FIG. 1.

Display system 100, when worn by a user/wearer, may receive both visual and/or auditory signals to create a particular sensory impression. For example, displays 104a and 104b may provide visual signals to the user/wearer that relates to the immediate proximity and/or surrounding of the user/wearer, as captured, e.g., by camera sensor(s) 108 or proximity sensor(s) 114, integrated into the display system 100. In another embodiment, the visual signals may be related to image data that may be sent to the display system 100 in a wired or wireless communication link. In another embodiment, visual signals may relate to image data that is created by a processor (for example, computer graphics) that is tightly, loosely, or not at all, bound to the user/wearer's surrounding. Such a processor and other related electronic and/or processing components may reside in a compartment and/or housing of the display system 100 (such as compartment 106).

In one embodiment, the personal display system may comprise one optical piece (possibly, covering both eyes in a visor-like fashion) or two optical pieces (possibly, covering each a left eye and a right eye, as depicted in FIG. 1). As disclosed further herein, optical pieces may comprise at least a portion having active emissive elements for the presentation of virtual images to the user/wearer. In other embodiments, optical pieces may comprise at least a portion of a transmissive portion where the transmissive portion may have features for modulating light (e.g., from real world objects) transmitting there through. In the case where the optical pieces comprise both a transmission portion and active emissive elements, the virtual images and real world images may interact according to user/wearer commands, image data, metadata or processing components in side pieces (as discussed further herein).

As mentioned, in one embodiment, one of the side pieces may be capable of being mated with frame of the personal display system. Such a side piece may comprise components—e.g., for processing and/or communications. These components may perform a number of functions, such as: inputting image data from an external source (in a wireless or wired manner), processing such image data according to user/wearer commands, external sources or its own internal processing components. It is possible in such a configuration for the personal display system to present a view of real world images, virtual images and/or a combination of both real world images and virtual images. Such virtual images may interact with real world images and overlay such real world images with metadata or otherwise interact with such real world images.

Display system 100 may input auditory signals to the user/wearer via earpiece(s) 112 and output speech from the user/wearer via MIC 110. The input auditory signals may relate—tightly or loosely—to the visual signals supplied to the user/wearer. In one embodiment, an antenna suitable for transmitting data from the user/wearer to a wireless access point may be incorporated into the microphone (or another suitable place on the frame) such that the amount of radiation emanating from the antenna will be a distance from the user/wearer's head, skull and/or brain to reduce any risk of radiation induced cancer.

In yet another embodiment, the personal display system may comprise a frame with optical piece(s) that comprise transmissive portions—comprising features that affect one of the many visual effects, e.g., polarization features, spectral separation features, other 3D features or the like. In such an embodiment, the front piece may comprise optical pieces that at least a portion of these optical pieces comprise active emissive elements. In this embodiment, the front piece may be in communication or otherwise electrical connection with the processing components in the side piece may interact with these active emissive elements in the front piece. For the purposes of the present application, it may suffice that the user/wearer have the option (possibly, by way of added, swapped or modular parts) of being presented with virtual images from the active emissive elements or a combination of real world images (from the transmissive part of the display system) and virtual images (from the emissive part of the display system).

As will be discussed in greater detail, applications of this system include but not limited to personal and cinematic 3D display, text-based, video and audio-based communications, navigation, gaming, augmented, virtual reality and wireless head-up display utilizing advanced user interfaces such as gaze tracking, body motion and gestures.

In the personal 3D display system disclosed herein, a viewer can be anywhere while experiences immersive 3D digital cinema, regardless of underlying technology. In one embodiment, the digital cinema server communicates wirelessly to the eyewear and displayed at maximum OLED matrix resolution in a shared viewing experience with an audience. In another embodiment, the personal 3D display system functions as high definition, high dynamic range video displays with built-in surround sound technologies.

Modular Design

Figure 2:
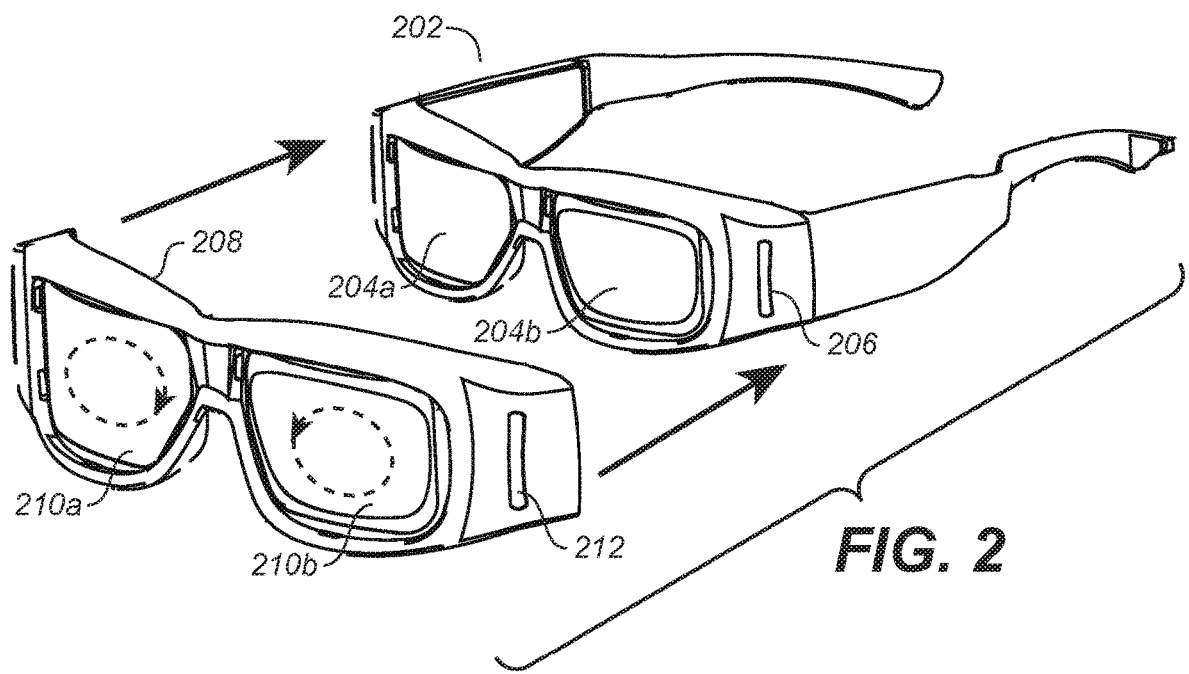
FIG. 2 shows one embodiment of a personal display system further comprising a modular front piece.

In some embodiments, the personal display system may have a high degree of modularity designed into the system. FIG. 2 shows one embodiment of the system have a modular features. Personal display may comprise a frame 202, and glass pieces 204a and 204b. Tabs 206 (on either side of the system) may be used to mechanically mate with a front piece 208 that may have associated slots 212—e.g., to hold the front piece 208 in place.

Glass pieces 204a and 204b may be, in one embodiment, active Transmissive/Transparent OLED (TOLED) displays (as further discussed herein) that would allow the user/wearer to see through them—while at the same time, presenting images from its active, emissive elements. The front piece 208 may have pieces 210a and 210b that have some interaction with the incident light—e.g., polarized glasses, spectral separation coatings or the like—to affect 3D images or the like to the user/wearer. In one embodiment, only a portion of the area of the glass pieces may comprise a plurality of active, emissive elements. In other embodiments, that portion may be the entire portion visible to the user/wearer's field of view may comprise active, emissive elements. Alternatively, that portion may be subset of the user/wearer's field of view.

Figure 3:
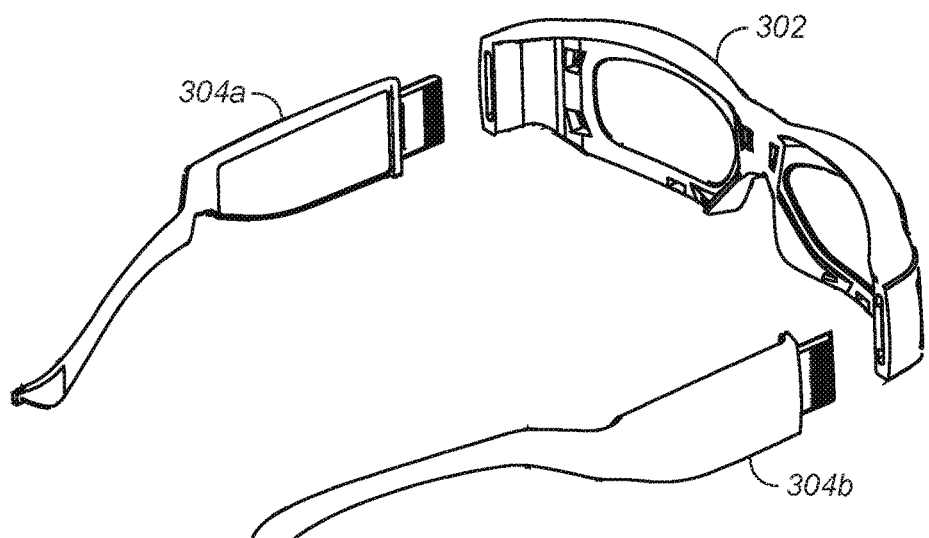
FIG. 3 shows one embodiment of a personal display system further comprising a modular side piece(s).
Figure 4:
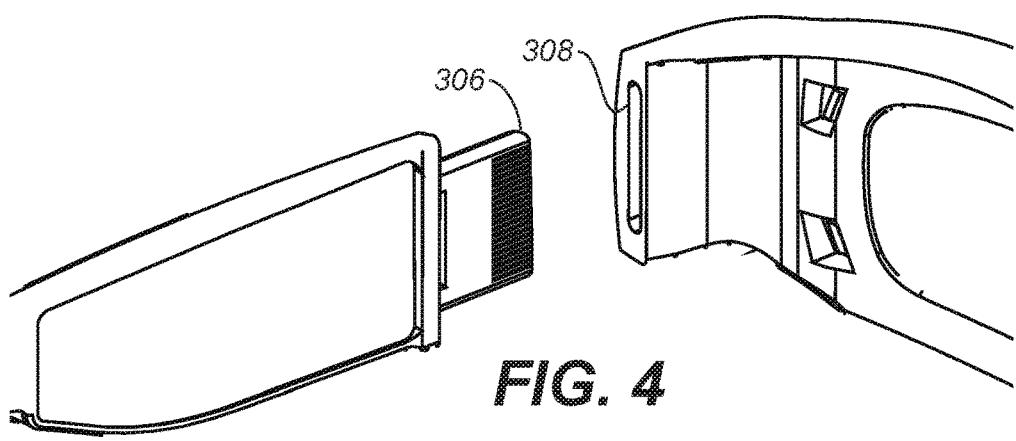
FIG. 4 shows one embodiment of a side piece mating to a frame.

In this and/or other embodiments, the personal display system may comprise at least one side piece that may be modular or otherwise swappable on the frame. In other embodiments, the personal display system may comprise two or more side pieces that may be modular or otherwise swappable. FIG. 3 shows one embodiment of a personal display in which side pieces 304a and/or 304b may be mechanically attachable/detachable from a frame 302. FIG. 4 depicts one manner in which the side piece may be so mated. Connector 306 may be formed to fit into slot 308—which, in addition to mechanical mating, may provide electrical and/or signal mating between the side piece and the frame.

In another embodiment, the device comprises of a pair of hinged temples. The hinged version of the device enables compact storage of the device when not in use. In this configuration, interconnection with the OLED displays may utilize polyimide-based flexible interconnecting circuits which offer high temperature resistance, superior dimensional stability, highly durable when subjected to bending stress, minimal outgassing characteristics and high resistance to solvents.

The mechanical construction of the frame may involve base materials that offer a high degree of chemical resistance and dimensional stability required in devices that come in contact with human skins such as eyewear and headwear. For example, synthetic polymers such as polyamides could be used to house driver circuitry, control electronics, and display devices while being highly compatible with advance manufacturing methodologies such as Laser Direct Structuring (LDS).

Figure 5:
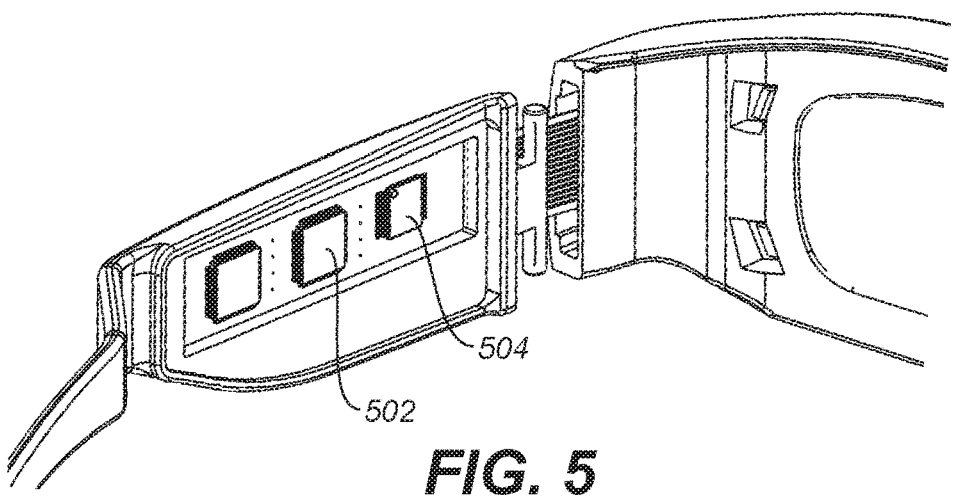
FIG. 5 shows one embodiment of a side piece further comprising a housing that comprises processing components

In reference to FIG. 5, and as further discussed herein, some electronics may be divided in some fashion between the frame and the side piece(s). FIG. 5 shows the side piece may house processing, storage or other electronics 504—and mated to a flex circuit 502, as is known in the art, within a housing formed in the side piece.

Figure 19:
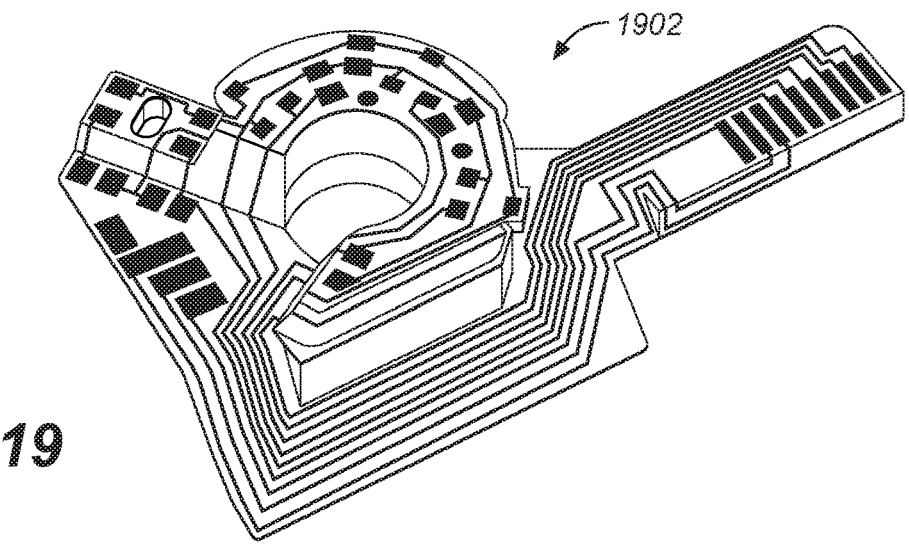
FIG. 19 shows one possible embodiment of a 3D flex circuit which may be used to electrically and mechanically mated electrical components in a personal display system.

FIG. 19 shows one possible embodiment of a 3D flex circuit which may be used to electrically and mechanically mate electrical components in a compact space. Construction of the eyewear frame may utilize advanced material and manufacturing methodologies—and may comprise (but not limited to) high performance polyimide-based interconnect and Laser Direct Structuring (LDS) which enables fabrication of precision, three-dimensional molded interconnect devices. In this method, flexible conductive materials are embedded and selectively removed by a laser. In this way, electrical conductors can be embedded in three-dimensional polymeric along with electronic components. In cases involving a high degree of compactness, LDS virtually eliminates the requirement for mounting and housing traditional two-dimensional printed circuit boards.

Figure 6:
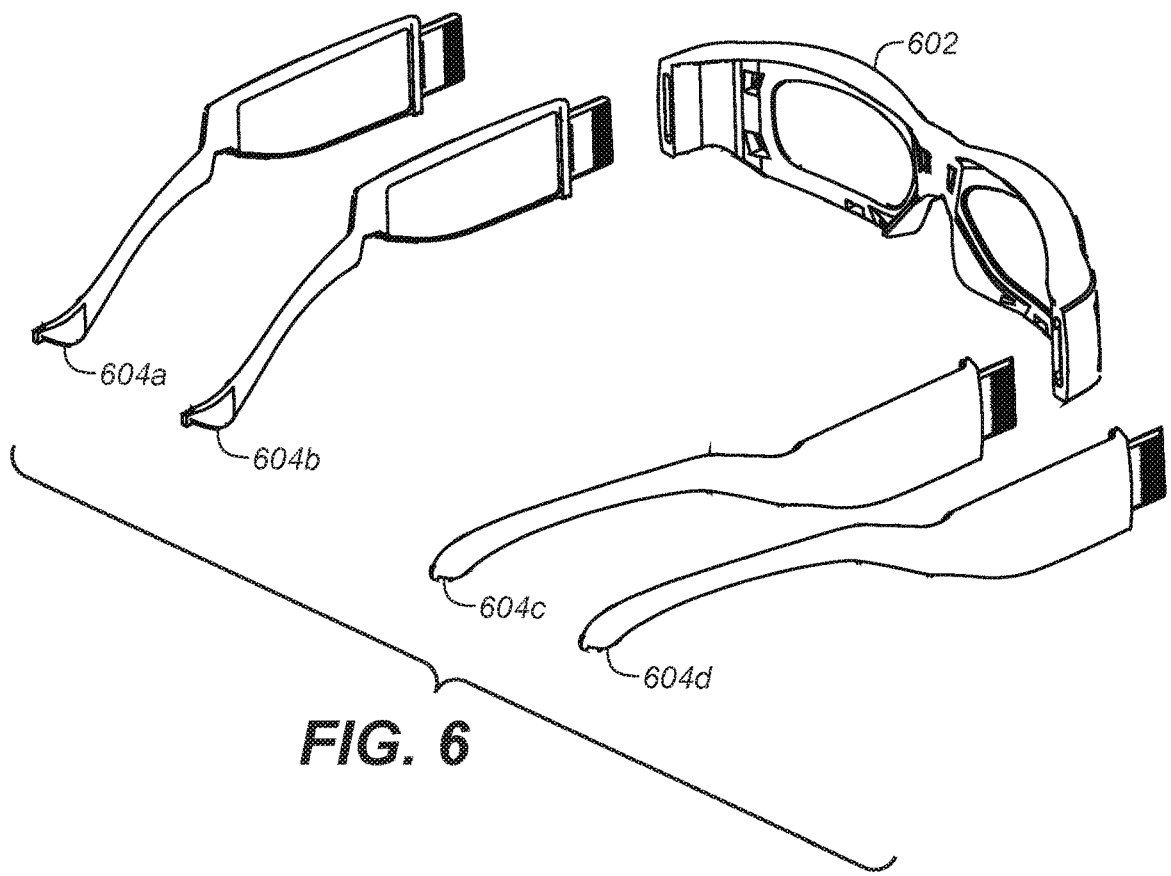
FIG. 6 shows yet other embodiments of various side pieces comprising different functionality may be mated to a frame.

FIG. 6 shows another modular embodiment of the present system. Frame 602 may be mated—mechanically and/or electrically—with a plurality of side pieces for different functionality—as may be chosen by the user/wearer at the appropriate time. Merely for example, side pieces 604a, 604b, 604c, and 604d might components that may provide night vision, gaming, wireless communications and vision enhancer services, respectively—or other image processing or data processing functionality. It will be appreciated that other side pieces, comprising different functionalities, are suitable and contemplated as encompassed by the scope of the present application.

Figure 7:
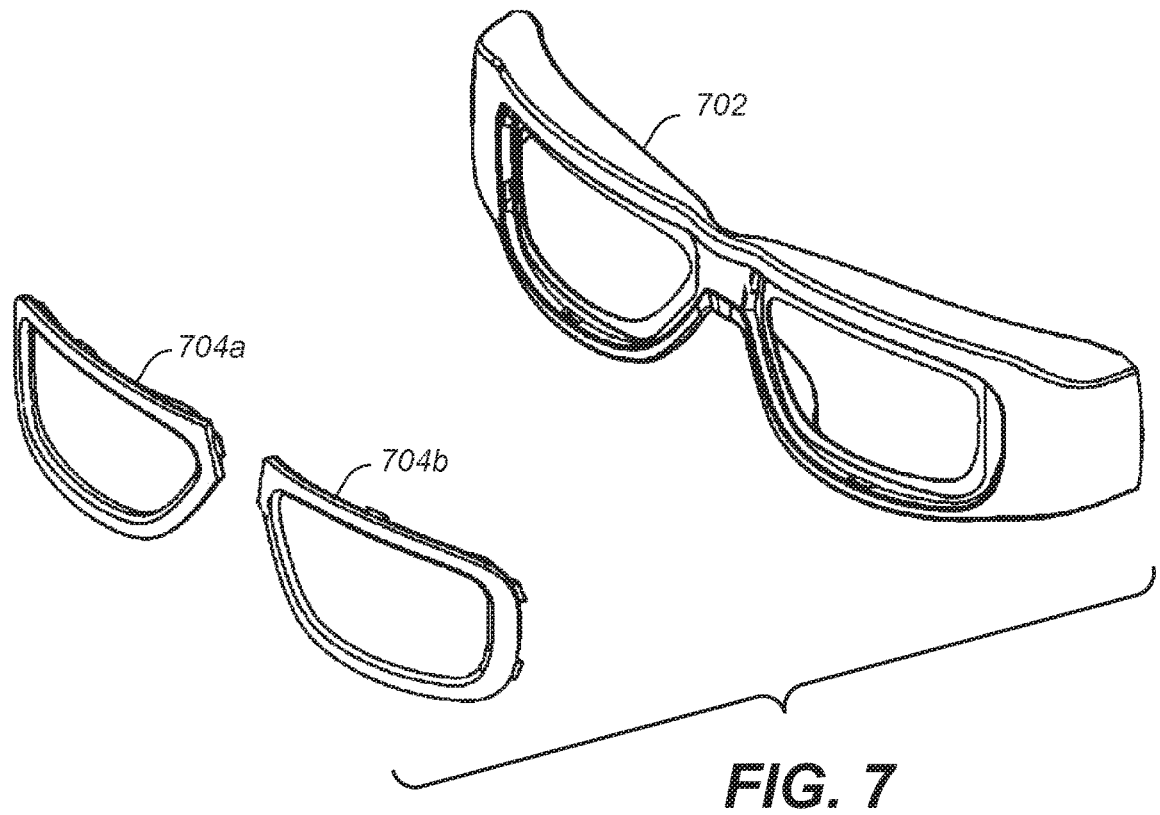
FIG. 7 shows one embodiment of optical pieces may be mated to a front piece or the frame.

FIG. 7 shows yet another embodiment of the present system. Frame (or alternatively, a front piece) 702 may mechanically and/or electrically mate with optical pieces 704a and 704b. These optical pieces may be either active or passive matrix TOLED or OLED emissive pieces, polarized glass, spectral separation coated glasses, shutter glasses or the like.

To address the issue of limited lifespan of first generation OLED displays, each display is detachable. Digital links between the displays and front frame is maintained by high density connectors at the display-frame interface. Snap fit of display to frame interconnection may be preloaded for constant and uniform pressure distribution across mating devices.

When usage exceeds a predefined hours of operation, an on-screen reminder will appear prompting the user to change the display. A recurring revenue business model may be built around this embodiment to insure that hardware and software of the system is kept up to date. OLED displays may be replaced as depicted in FIG. 7.

Optical Emissive Pieces

As described herein, optical pieces—e.g., that mate mechanically and/or electrically—may be made to create virtual images via an emissive technology, such as TOLED, OLED, quantum dot or other suitable technology.

For example, in one embodiment, the OLED display may be manufactured with transparent conductive oxides including but not limited to Aluminum doped Zinc-Oxide (AZO) or Indium-Tin-Oxide (ITO) to create a high level of transparency. Individual OLED pixels are addressed by an active matrix of thin film transistors (TFTs) that may also be transparent. For example, TFTs may be based on wide-bandgap semiconductor Zinc-Tin-Oxide (ZTO) which has a transmittance of 80% or better in the visible light spectrum. Driving TFTs may be overlaid directly on top of the driven OLEDs, forming a combined transmittance of 70% or higher. In another embodiment, the system may be based on bi-directional OLED with integrated CMOS sensor array. This functionality may allow an imaging sensor to be tightly integrated with the OLED display matrix. The result is a virtual, on-demand transparent image.

Figure 8:
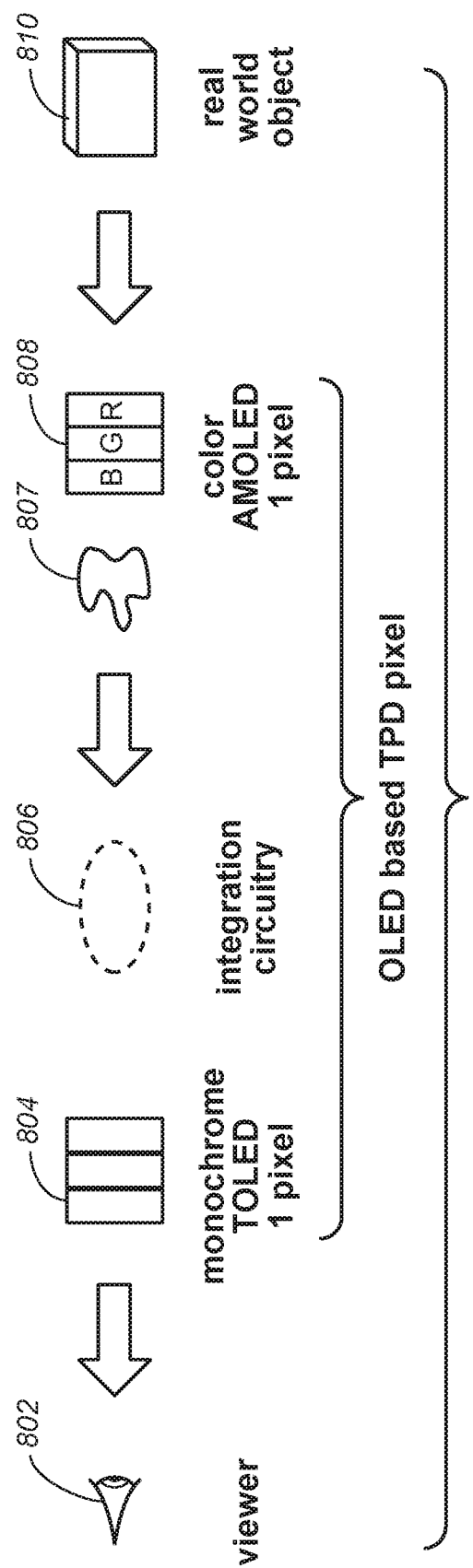
FIG. 8 shows a possible optical and/or light path that a user/wearer of a personal display system may experience.

FIG. 8 shows one possible optical and/or light path that a user/wearer may experience. Light (reflected or emitted) from real-world objects 810 may be transmitted through the active glasses. Pixel element 808 depicts one pixel element (comprising, for example, an AMOLED RGB pixel) through which light may transmit. In addition, AMOLED pixels may be activated via integration circuitry 806—such as Thin Film Transistor (TFT) structures—to provide suitable control signals to the pixel structure. In addition, a second active glass layer 804 may comprise a monochrome TOLED or OLED structure to provide additional light modulation—e.g., to increase the dynamic range of the image or otherwise preferential modulate the light or enhance brightness in preferred regions on the eyewear. Either elements 804 or 808 may be sufficient in isolation depending on the application.

As the light (and image formed therefrom) transmits through the active glasses, virtual objects 807 may be formed by the active glasses, thereby both real world objects and virtual objects may be presented to the user/wearer 802—for a variety of services and/or effects. In one embodiment, a virtual screen of information may pop up when the user/wearer is regarding a particular real world object—e.g. a person, building, structure or the like—that may pertain to the real world image being regarded.

Figure 9:
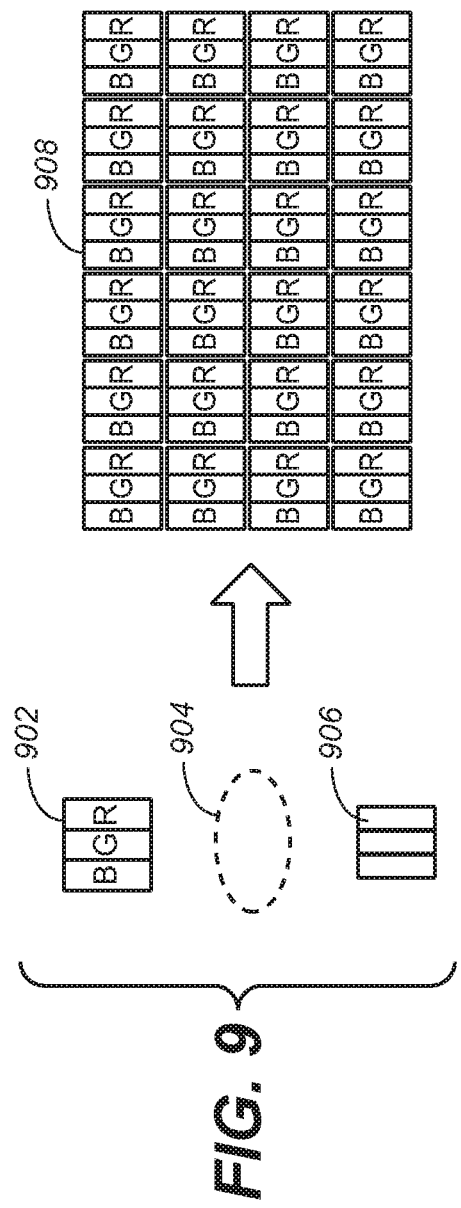
FIGS. 9, 10, 10A and 11 depict possible array architectures for active glasses and/or optical pieces that may comprise a portion of the personal display system.
Figure 10:
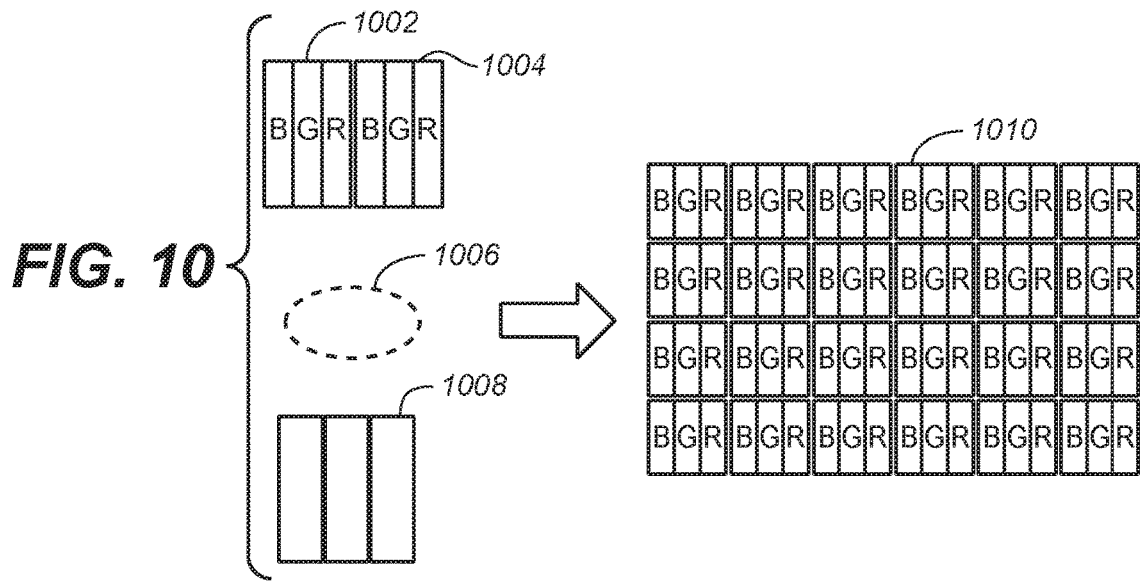
Figure 11:
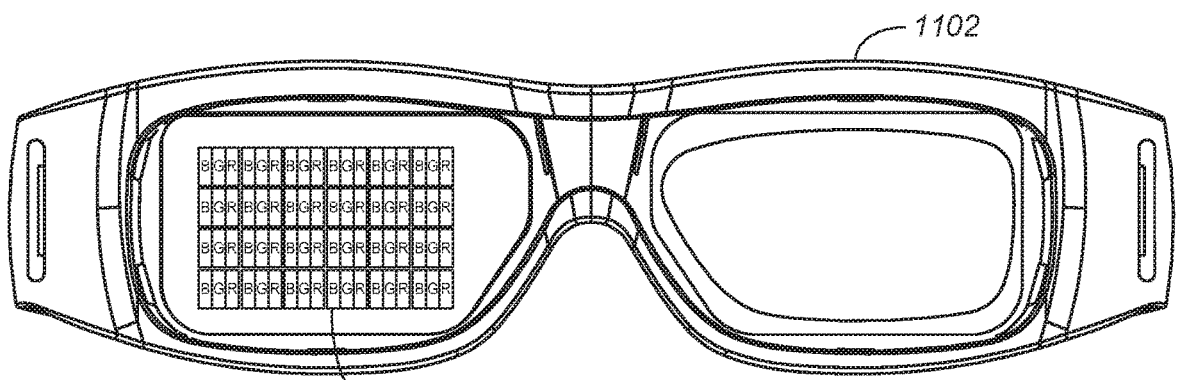

FIGS. 9, 10 and 11 depict embodiments of possible array architectures for the present display system. FIGS. 9 and 10 depict a pixel-level implementation of OLED involves arrays of Active Matrix OLED (AMOLED) (902, 1002 and 1004) integrated with Transparent OLED (TOLED) (906 and 1008) arrays and driver circuitry (904 and 1006), forming a single or multiple high resolution displays (908 and 1010) in which the degree of luminance, color and transparency may be accurately controlled. The extended dynamic range allowed by the two controllable stacked OLEDs permit for more faithful reproduction of cinematic and other entertainment content. FIG. 11 depicts one such pixel level embodiment realized within optical pieces 1104 when integrated with a frame and/or front piece 1102. It will be appreciated that the pixel structure is not drawn to scale—and the number of pixels and degree of resolution for the optical pieces may be preferentially chosen for a given application.

Figure 10A:
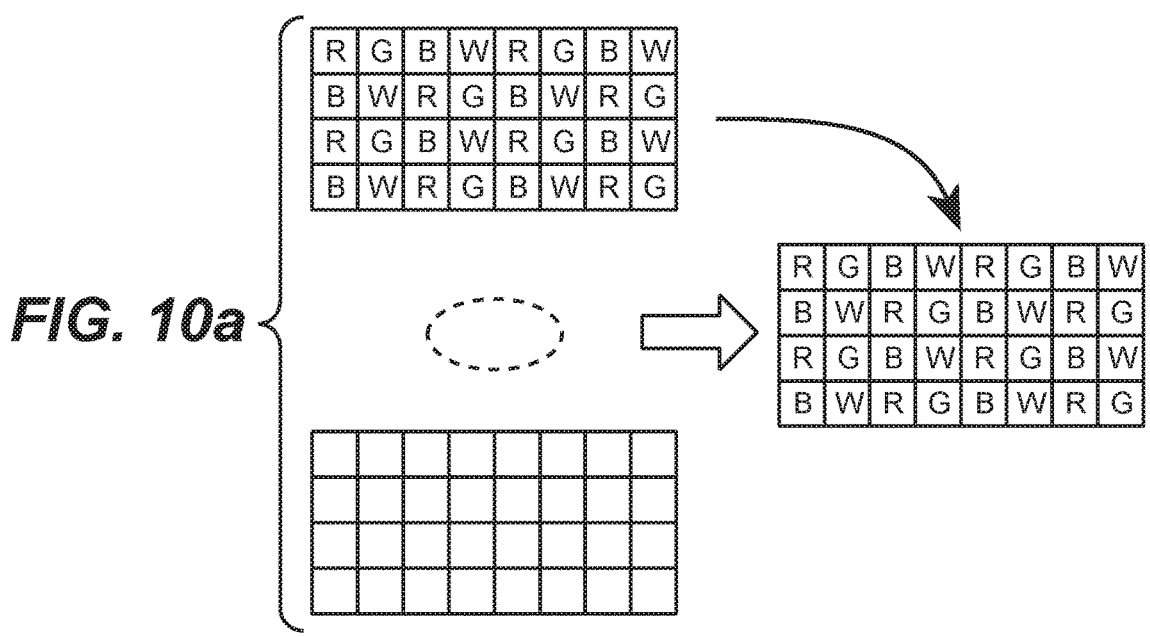

It will also be appreciated that the pixel structure may be RGB stripe (or other colored subpixel combination); but may also comprise other known pixel structures as well—e.g. Bayer pattern, PenTile patterns or the like. FIG. 10A depicts one embodiment with a PenTile RGBW layout pattern for the optical piece may suffice. With a layout such as a RGBW (PenTile or otherwise), higher throughput emissive pixels may be achieved, possibly comprising lower power consumption, higher resolution and more readable text rendering.

The choice of pixel structure for a modular optical piece may be chosen according to a given application. In addition, transparent OLED optical pieces may be substituted with transparent, color or monochrome LCD optical pieces.

In one embodiment, the integrated display on the optical piece may be mounted on a transparent substrate where active elements are sealed and encapsulated from exposure to ambient air and moisture. For example, the external surfaces of the lenses may be hard coated with well-known techniques such as vacuum deposition or chemical coatings. In addition, the OLED display's connection to external circuitry may be sealed and shrouded such that minimal exposure to the environment may be achieved.

Some Use Embodiments

Figure 12:
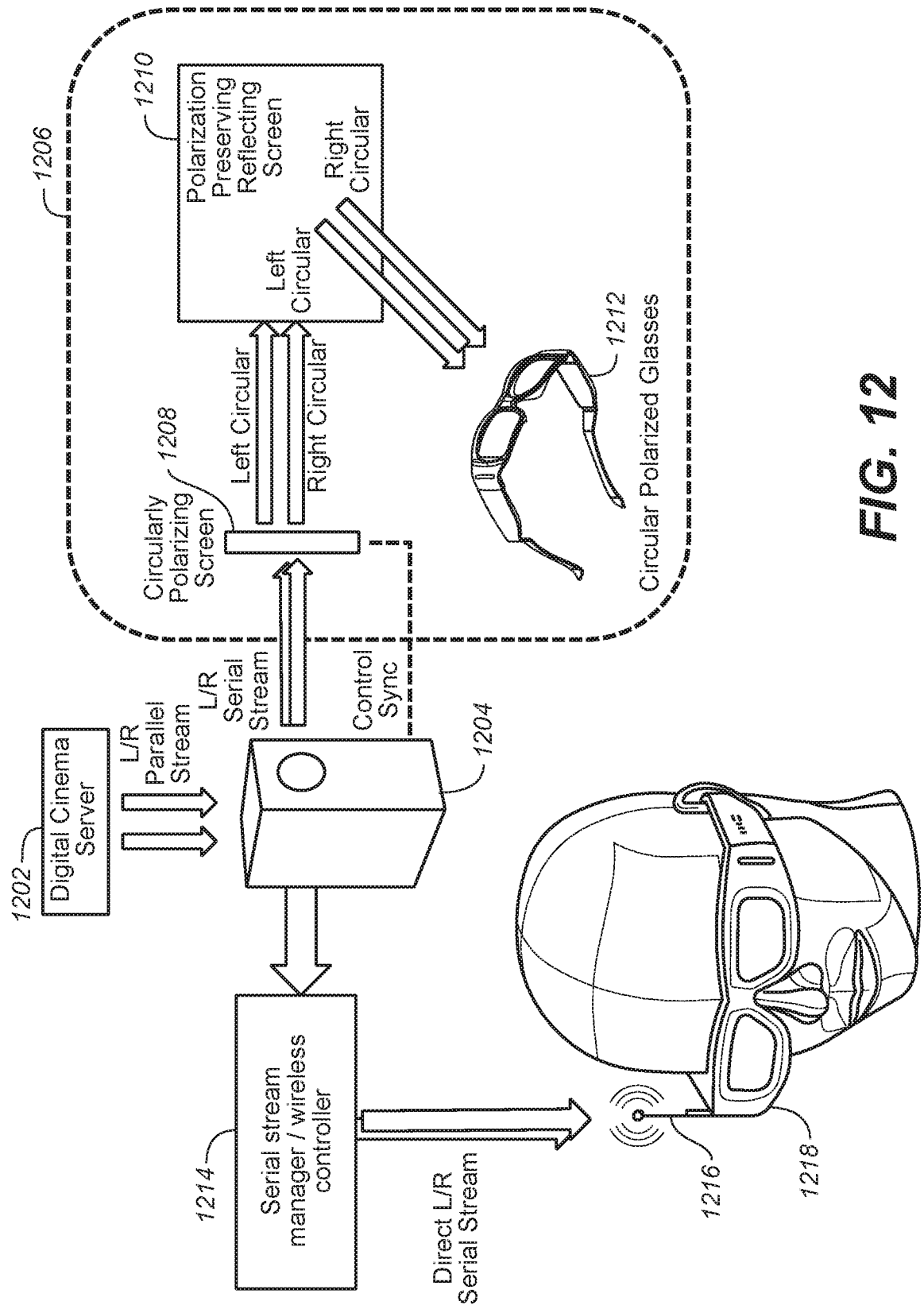
FIGS. 12, 13 and 14 depict various embodiments of environments in which the personal display system might operate.

Having described the personal display system itself, it will now be described some particular use embodiments. FIG. 12 depicts one use embodiment of personal display system 1218 may be in communication either wirelessly (as depicted by antenna 1216) or wired (not shown) with a stream of image, audio and/or other data or metadata via controller 1214 (and/or some external source). One possible data stream may be generated by digital cinema server 1202 which may be in communication with a projector system 1204. Projector system 1204 may produce Left (L) and Right (R) image data (possibly in a serial stream).

FIG. 12 also depicts the projected light from projector 1204 may transmit through a polarizing screen 1208 (synchronized by a control sync signal as shown) to affect a left or right circular polarization of the light—the polarization of which is substantially preserved with reflected off of a silver screen or other polarization-preserving reflecting screen 1210. If a viewer is wearing circularly polarized glasses 1212, then the viewer may be treated to a 3D image.

The same 3D image may likewise be presented to a user/wearer of the personal display system in one of two ways: (1) the image data may be streamed to the personal display system and the L/R image data may be presented individually to each L and R eye of the user/wearer. Alternatively, if the user/wearer has attached a properly polarized front piece and/or optical pieces to his/her personal display system, then the user/wearer may be viewing the reflected light from screen 1210. In addition, active glasses (if available) could be presenting on-demand information that may be germane or pertinent to the primary image being viewed—e.g., information about videos, title, time, credits or any other data or metadata.

Figure 13:
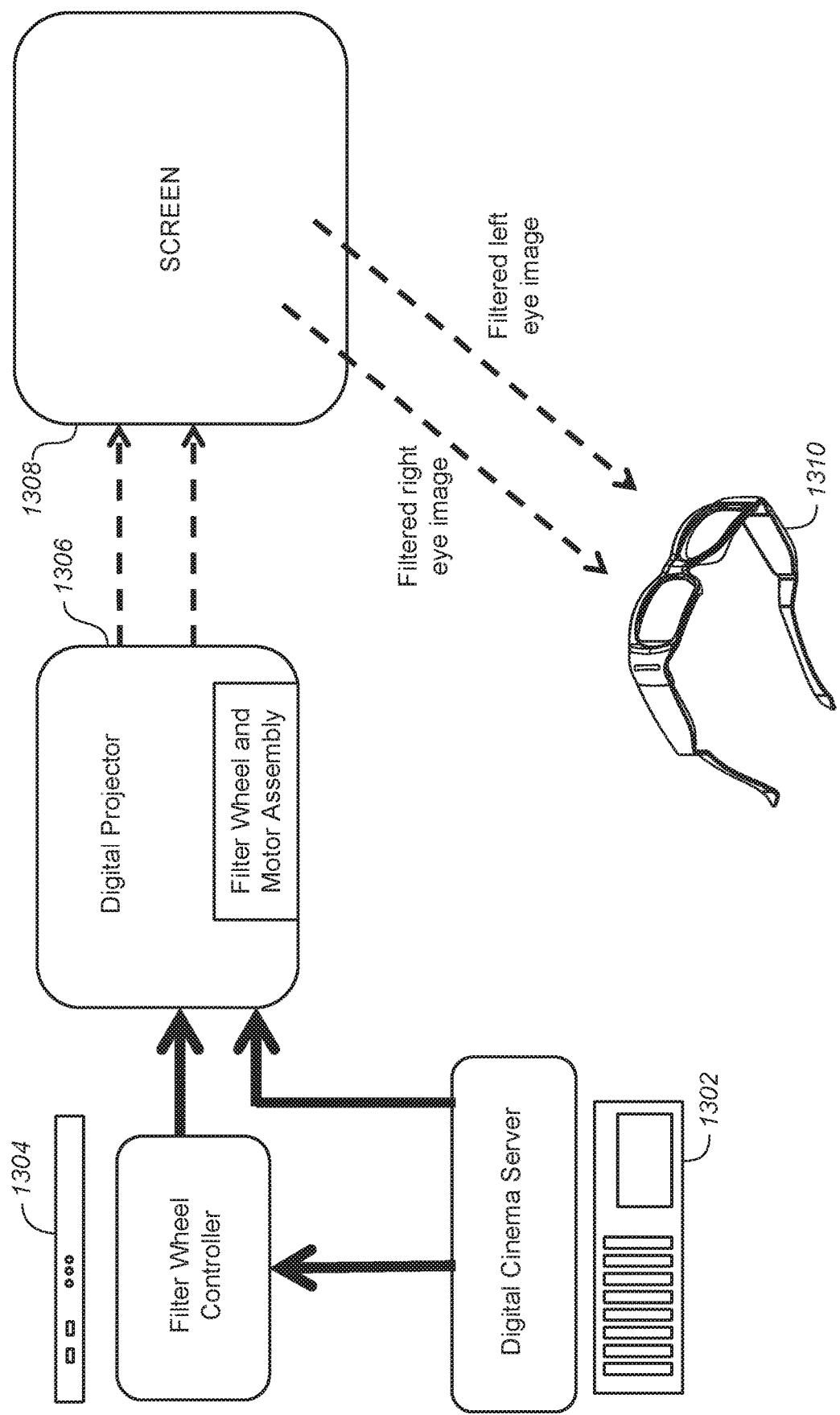

Yet another use embodiment is depicted in FIG. 13. In this environment, digital cinema server 1302 could transmit image and other data to both a filter wheel controller 1304 and/or digital projector 1306. Light from projector 1306 may be reflected from a screen 1308 and the filtered L and R eye image data may transmit through personal display system 1310 that comprises the proper front piece and/or optical pieces to properly interact with the filtered L and R eye image data. In some embodiments, personal display system 1310 may be in communication with some external source, sending image data or some metadata, so that the personal display system may have virtual images interact with transmitted real world images.

Figure 14:
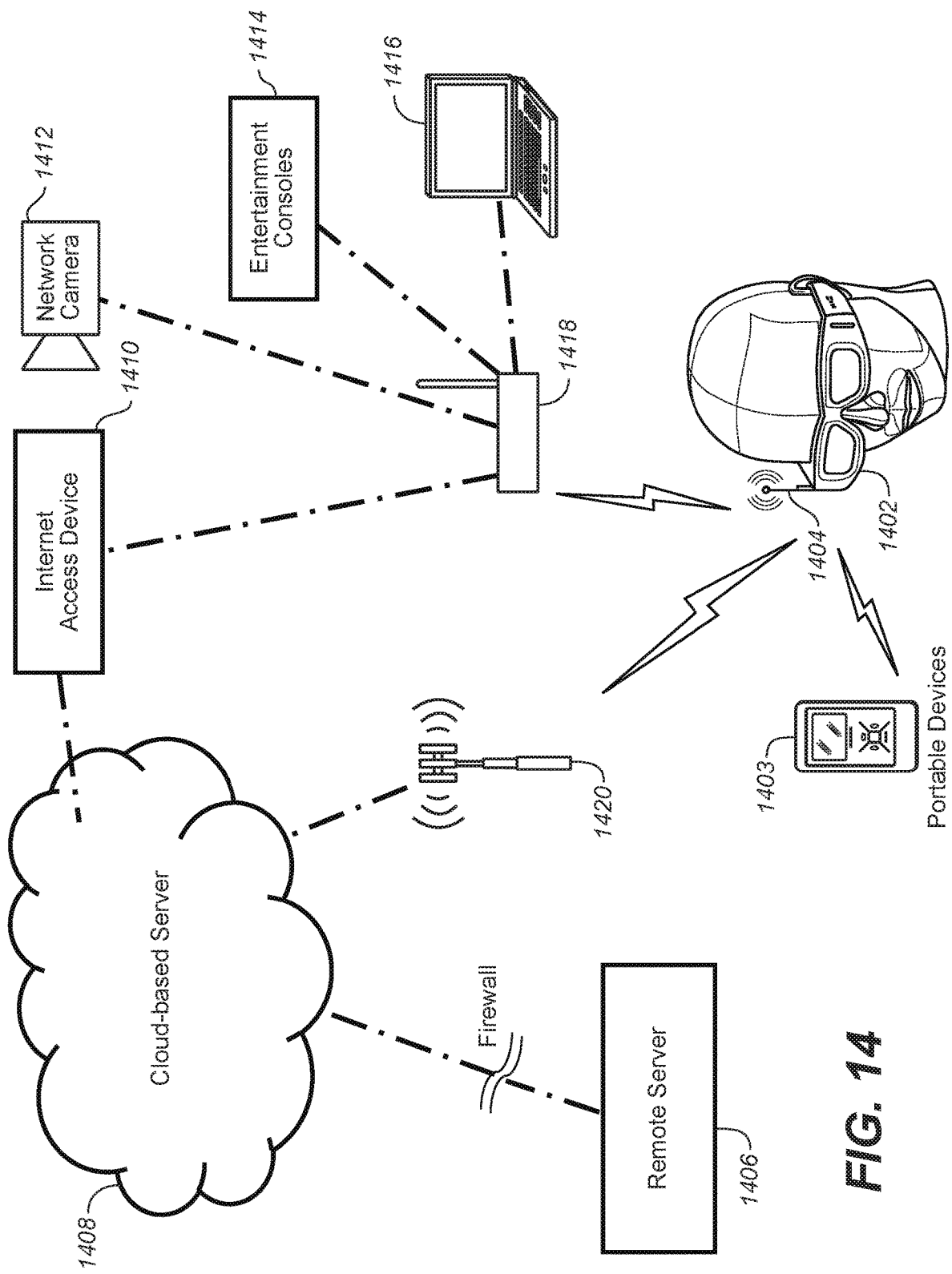

FIG. 14 shows yet another environment in which the personal display system may be used. Display system 1402 may be in communications with its environment and/or external sources—either wirelessly (as depicted by antenna 1404) or wired (not shown). It will be appreciated that the personal display system may interact with a plurality of devices in a desired fashion. One possible path may start at a remote server (comprising image, audio, other data, metadata or the like) that is desired to send to the user/wearer. This data may flow through a cloud-based server 1408 via the internet or other network environment—and streamed out over a wireless antenna 1420.

Alternatively, antenna 1420 may be the antenna to a smart device and/or smart phone 1403 and communicating with the personal display system via Bluetooth, NFC or any other suitable standard.

Alternatively, personal display system 1402 may communicate through some wireless access point 1418 to a variety of devices—such as, the internet 1410, a camera 1412, entertainment console 1414, computer 1416, or the like.

Eye Tracking Embodiments

Figure 15:
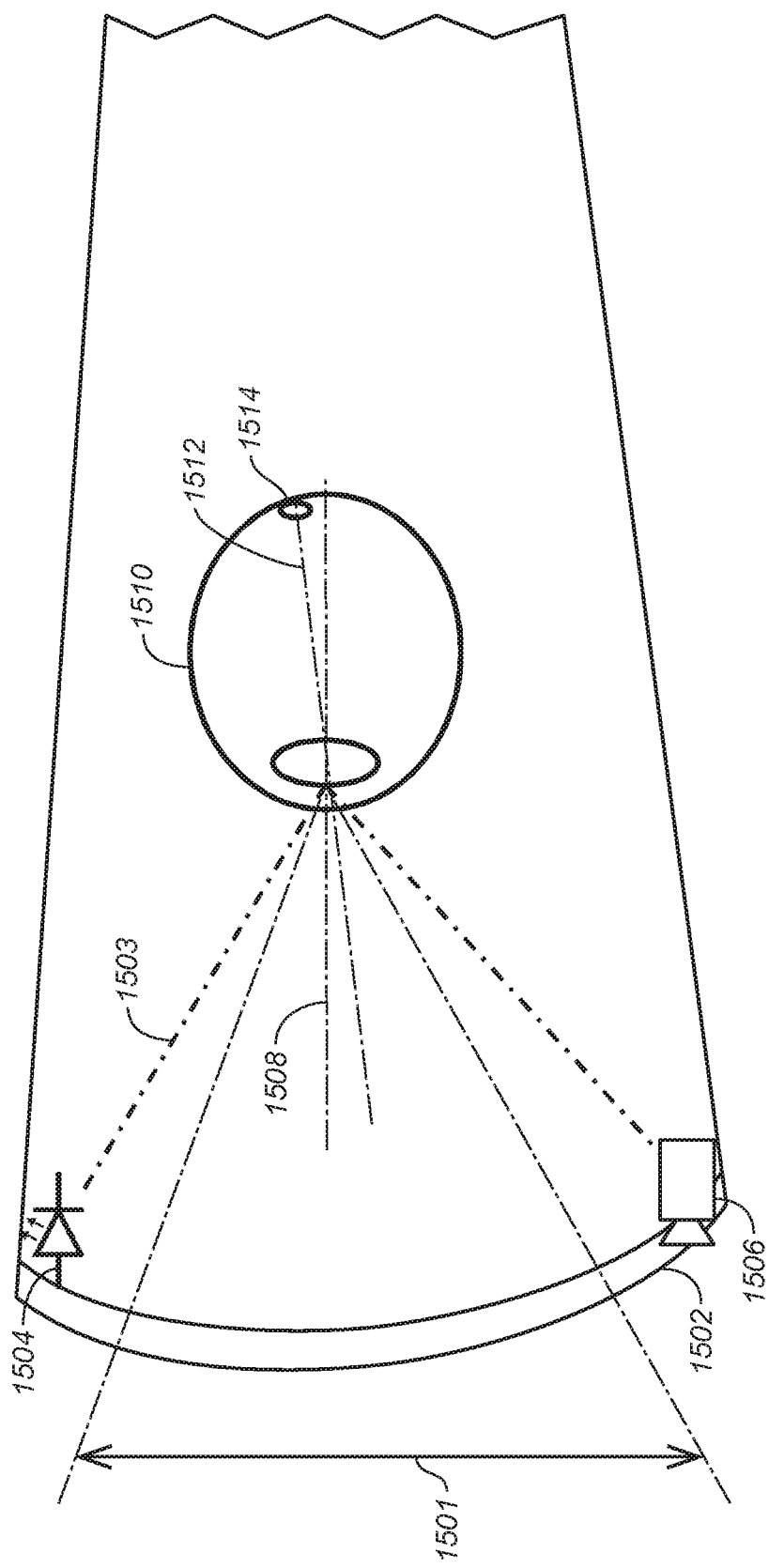
FIG. 15 depicts one embodiment of a personal display system further comprising an eye tracking system.

With the modular and flexible design options afforded by the present system, many other embodiments are possible. FIG. 15 depicts one embodiment that affects an eye tracking system.

A side view of the personal display system and viewer's eye is shown in FIG. 15. Optical piece 1502 may present both real objects and virtual objects as described herein. Light from real and virtual objects are placed into the optical path of the eye (shown as cone 1501). A smaller cone 1512 is shown that is focused by the eye 1510 via the eye's lens to the back of the eye and at the fovea 1514.

Light source 1504 may be integrated into the personal display system to affect visual tracking of the eye—e.g. its iris and pupil. Light reflected off of the eye may be detected by image sensor 1506 to determine where the user/wearer is currently focused. As depicted by heavier dashed-dotted line 1503, it may be desirable to keep the light used for eye tracking outside of the cone that the eye might perceive while viewing real world objects and virtual objects through the optical pieces. Image sensor 1506 may send signals back to a processor—residing either on or off the personal display system—that correlate with the area of the viewer's field of vision that the viewer is focusing upon. Such information may affect a number of control points for the user or the system and may enable services or the presentation of metadata to the viewer that may be desirable.

Eye tracking apparatus enables a graphical user interface that allows the user to select a given function or issue a command to the display. For example, reviewing scenes or changing volume of audible sound or intensity and contrast of the image being displayed. Eye tracking enables real time monitoring of the state of alertness of the user via pupil movement detection. For example, if a driver falls asleep behind the wheel, an exception signal may be generated resulting in commands to internal and external controllers triggering an audible alarm or other emergency measures. Eye tracking may also allow for hands free control of the augmented information display features on personal eyewear.

Utilizing iris recognition technologies and either the imaging sensors of said eye tracking apparatus or OLED-imbedded CMOS sensors, data of the user's eyes could be analyzed, stored and queried each time the device is used thereby providing the highest level of security and privacy. In one embodiment of the invention, the CMOS sensors may be embedded solely along the outer periphery of the eye wear and the sensor data can be interpolated to provide approximate iris tracking.

Other Alternative Embodiments

In continued reference to FIG. 1 and other figures herein, yet other embodiments of the present system are possible. For example, one embodiment may utilize proximity sensors along the temples allow an enhancement of situational awareness for the viewer. In addition, accelerometers determine head motion with respect to reference inertial frame. This data may provide the user interface with directional inputs to display controller or communication module of the head wear.

Externally mounted camera with high power optical and digital zoom could be used as a live video feed to the OLED display. Having this feature may allow the user to drastically enhance far field, near field and macro vision. In addition, advanced image analysis enables real-time recognition or instant review and analysis of recorded events. Examples of this capability include but not limited to facial recognition, environmental, motion analysis, training, video conferencing, medical and law enforcement. The OLED display may be configured to receive video inputs from externally mounted night vision camera.

Audio input/output devices with noise cancellation and situational volume control may also be desirable. For example, an externally mounted microphone will monitor not only from the user's voice but also sound emitted from the surrounding environment and alert the user of abrupt or growing audible inputs. Microphones could be used to significantly enhance sound for the hearing impaired. In addition, voice recognition applications could be employed to encode and decode the user's commands and conversation. Potential use of said features could include communication and social networking applications such as voice-generated tweets and Facebook postings.

Integration of a personal surround sound system with OLED display may serve to create an immersive virtual reality experience—as well as full capability of surround sound in cinematic viewing in the form of a personal theater. Such a system might enhance an interactive situation with other users, such as in a multiplayer game. For one example, with such a personal display system, a car racing game with multiple users is possible—e.g., where one user moves their head to the left to 'see' another driver over taking them, and the image displayed on the screen 'tracks' the movement of the user's head utilizing built in sensors.

In addition, the eyewear may include a MEMS-based digital compass and a built-in GPS that provide accurate feedback of the user's position and direction of heading. The inclusive wireless module may also enable the user to reach cloud-based data and instructions at all time. Typical applications might include interactive learning, operational guidance, contact information search, music and video entertainment, medical and pharmaceutical instructions.

The electronic architecture of the glasses would be so designed that it would become a standard interface to wired and wireless devices such as Google's Android OS and Apple's iOS. This would provide a standard environment for developers to produce applications utilizing the array of sensors, technologies and display flexibility of the glasses.

Possible System Architecture Embodiment

Figure 16:
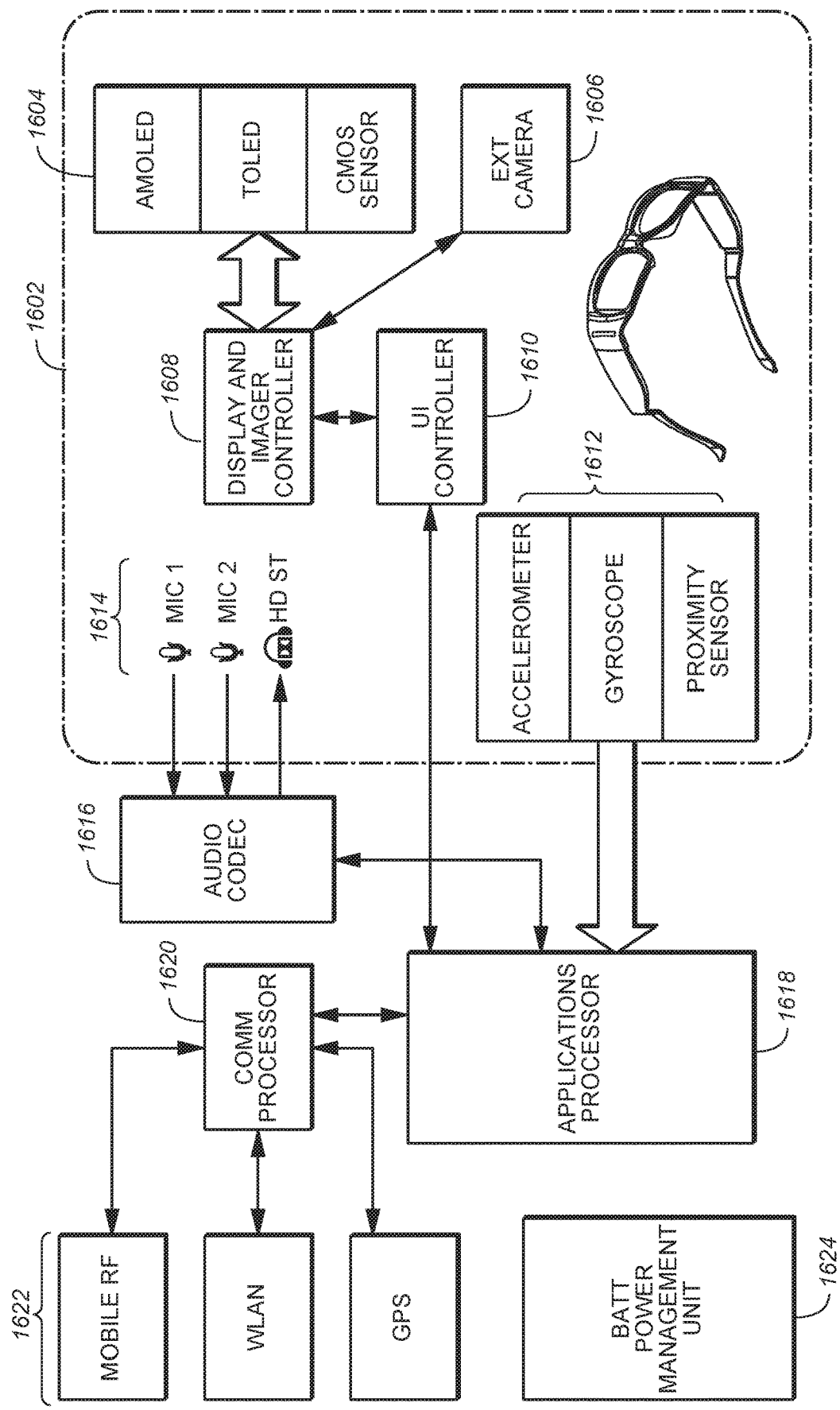
FIG. 16 depicts one embodiment of a system-level architecture for a personal display system.

FIG. 16 depicts one possible system-level architecture in block diagram form. In this embodiment, it may be possible to partition the functional blocks—either upon the personal display system itself, or off of the display system and onto devices that are in communication with the personal display.

In FIG. 16, one embodiment the features incorporated onto the personal display as shown in the area contained by dotted line 1602. Display system may comprise active optical pieces 1604, external camera 1606 (which may present user/wearer with images in the immediate surroundings, e.g., behind the user/wearer or the like), display and imager controller 1608, User Interface (UI) controller 1610, a plurality of sensors 1612 (e.g., accelerometer, gyroscope, proximity detector), a plurality of input/output devices (e.g. MIC 1 and/or 2, HD stereo headphone and the like).

Off of the personal display, other functional components may be interacting with the personal display. For example, audio codec 1616, applications processor 1618, communications processor 1620, a plurality of communications components (e.g., mobile RF, WLAN, GPS) and a battery power management unit 1624 (which may control power from a battery which may be incorporated into the personal display system (not shown).

It will be appreciated that other embodiments and other partitions of functionality are possible and the scope of the present application encompasses all such variations.

Advanced Optics

In the area of virtual reality and wide field of view optics, it is known that LEEP optics and other optical technology may be used to enhance the viewing experience. Such optics are described further in: (1) U.S. Pat. No. 4,406,532 to Howlett entitled "WIDE ANGLE COLOR PHOTOGRAPHY METHOD AND SYSTEM"; (2) U.S. Pat. No. 7,417,617 to Eichenlaub entitled "ENHANCED RESOLUTION FOR IMAGE GENERATION"; (3) United States Published Patent Application Number 2011248904 to Miyawaki et al. entitled "HEAD MOUNTED DISPLAY AND OPTICAL POSITION ADJUSTMENT METHOD OF THE SAME"; (4) Article entitled "LIGHT PROPAGATION WITH PHASE DISCONTINUITY: GENERALIZED LAWS OF REFLECTION AND REFRACTION" by Yu et al. (the "Yu article") and published in Science Magazine, Vol. 334), Oct. 22, 2011 (available at www.sciencemag.org/cgi/content/full/science.1210713/DC1)—and are herein incorporated by reference in their entirety.

Figure 17:
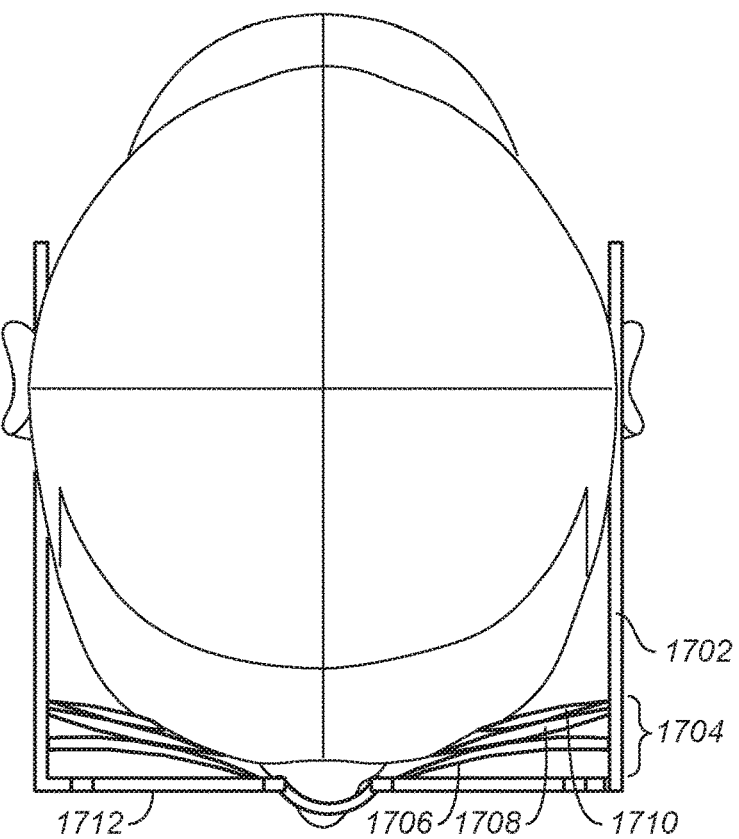
FIGS. 17 and 18 depict one embodiment of a personal display system comprising additional and/or other optical elements that may improve wide viewing or other viewing aspects.
Figure 18:
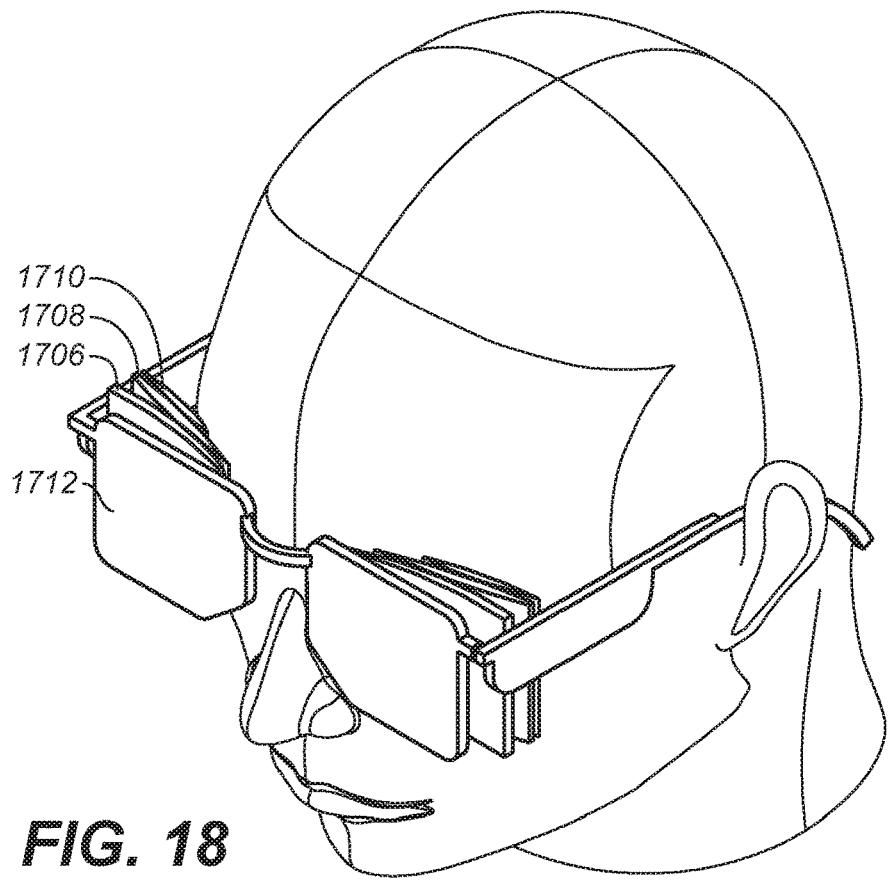

To achieve a wide viewing and visual experience, some embodiments of the personal display system of the present application may include additional or other optical elements. FIGS. 17 and 18 show a top view and a perspective view of one embodiment of the personal display system 1702 as worn by a user/wearer comprising such additional or other optics. Active glasses 1712 may be constructed with the OLED and/or TOLED as mentioned herein—to create virtual images. A series of optical elements 1704 may be placed into the viewer's optical path. In this embodiment, series of optical elements 1704 may comprise a group of concave, planar and convex lenses (as depicted as elements 1706, 1708 and 1710) in such a fashion as to affect wide viewing or affect desired focus of closely rendered virtual objects or other LEEP optical effect.

Figure 20:
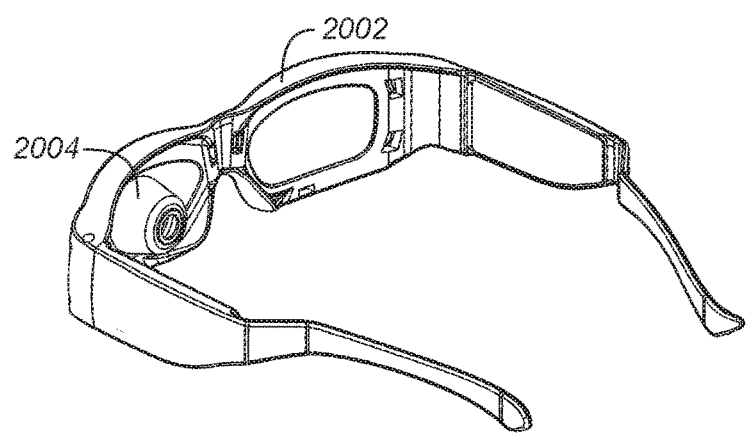
FIG. 20 depicts one embodiment of a personal display system comprising liquid and/or fluid based optical elements that may improve wide viewing or other viewing aspects.
Figures 21A, 21B:
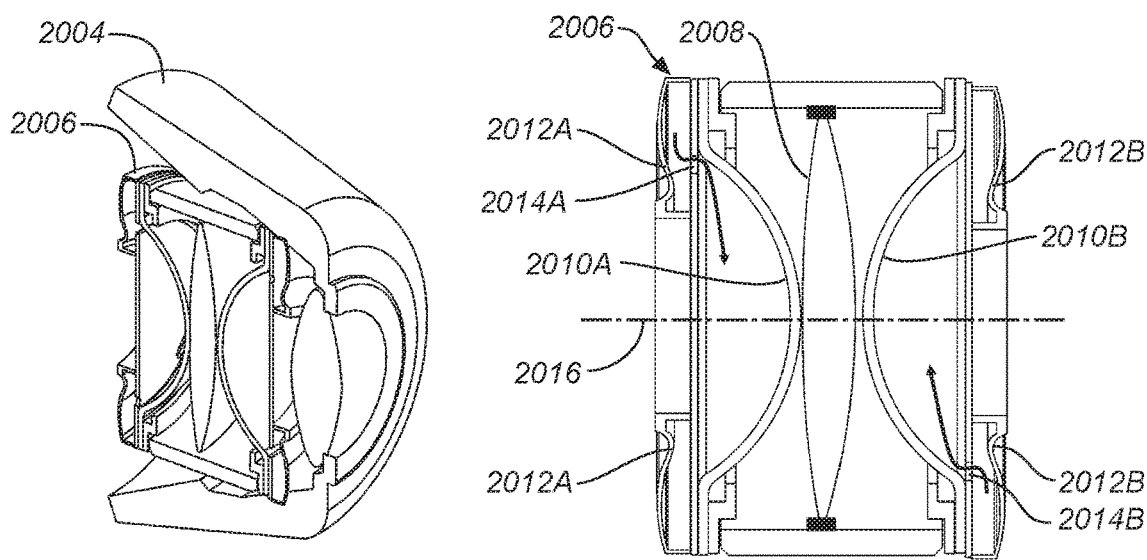
FIGS. 21A and 21B depict embodiments that comprise one or more sets of circular piezoelectric bending actuator and a circular glass window with orifices that enable the flow of fluids from stored in the actuator chamber into the lens chamber.

For other embodiments, iteration of focal distance desired for near-eye display could be affected by techniques employing fluids of varied indices of refraction forming a near-spherical lens profiles. Such other embodiments of advanced optics are depicted as shown in FIGS. 20, 21A-21B, 22A-22B. In FIG. 20, personal display system 2002 may further comprise a liquid or fluid based optical element 2004 (or elements, if it desired to interact with both eyes) that may possibly be dynamically controlled with bias voltage—as shown in FIGS. 21A,B and FIGS. 22A,B.

Alteration of focal distance for near-eye display may be affected by techniques employing fluids of varied indices of refraction forming a substantially near-spherical lens profiles. The fluidic lens system depicted on FIGS. 21A and 21B comprises of one or more sets of circular piezoelectric bending actuator and a circular glass window with orifices that enable the flow of fluids from stored in the actuator chamber into the lens chamber. The lens chamber (2006) is enclosed by a clear silicone membrane of typical thickness of 100 to 500 micron. As fluid is forced into the lens chamber, the silicone membrane inflates, resulting in a reduction in focal length of the lens. An external housing, (2004), serves as a protective case which encloses electronic components and interconnection with the piezoelectric bending actuators.

In one embodiment, chamber 2006 may comprises lens element 2008 (possibly made of glass, plastic or any other suitable material), membranes 2010*a* and 2010*b* (possibly made of any flexible materials suitable for holding liquid), actuators 2012*a*, 2012*b* that may be useful for affecting the in-flow and out-flow of a liquid into the membranes through ports 2014*a* and 2014*b*. The flexible membranes—under suitable control signals from processing components—may change relevant optical characteristics along an optical path 2016—e.g. focal length or the like. It will be appreciated that other chambers are possible—for example, one flexible membrane may suffice or other lens combinations (e.g., of zero, two or more lenses) may suffice.

In this and other embodiments, e.g., in FIGS. 21A, 21B, 22A and 22B, electrowetting and piezoelectric actuation methods could be employed to shape the lens in order to achieve the desired focal lengths. Electrowetting effects may be achieved by one or more electrodes enabling a varying electric field which in turn controlling the contact angle of the liquid-liquid interface, thereby the desired variable focal distance. To achieve stability of the optical axis or the ability of the lens to work in all possible orientations thus negating the effect of gravity, liquids of similar densities may be used. When an electric field is applied to the electrodes, the contact angle between adjacent liquid may be changed; thus resulting in a change to the focal distance.

The fluidic lens system depicted on FIGS. 21A and 21B may comprise of one or more sets of circular piezoelectric bending actuators, 2012B, 2012A and a circular glass window with orifices, 2014A, 2014B that enable the flow of fluids from stored in the actuator chamber into the lens chamber. The lens chamber is enclosed by a clear silicone membrane (2006) of typical thickness of 100 to 500 micron. As fluid is forced into the lens chamber, the silicone membrane inflates, resulting in a reduction in focal length of the lens. An external housing, (2004), serves as a protective case which encloses electronic components and interconnection with the piezoelectric bending actuators.

Figure 22A:
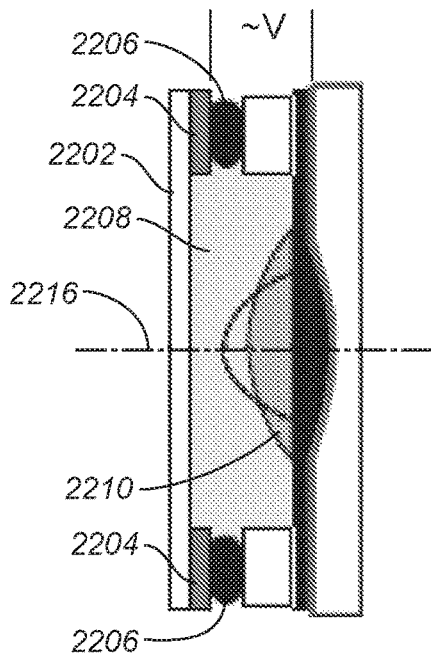
FIGS. 22A and 22B depict embodiments that comprise a water-oil liquid based optical element system.
Figure 22B:
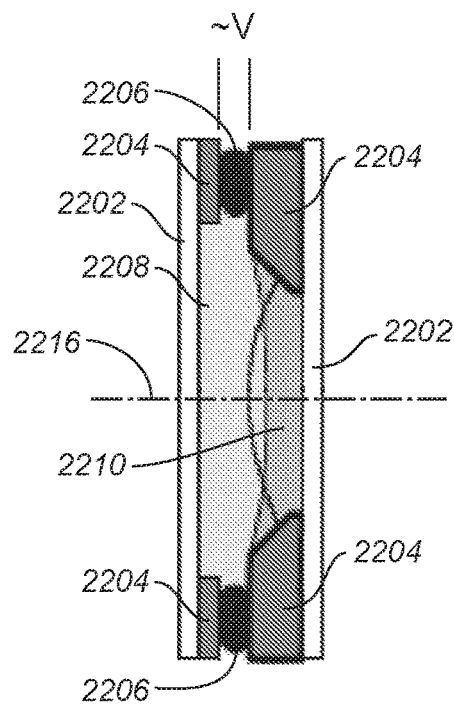

In a piezo-driven bending actuator, a given fluid is forced from one chamber to another, in turn applying stress on membranes thereby changing the focal distance or some other optical characteristic. In one embodiment, the chamber may contain either one fluid or the chamber may be partitioned to contain a plurality of fluids—e.g., water and oil. The embodiments of FIGS. 22A and 22B are shown, comprising layers, e.g., glass or other suitable transparent material (e.g. plastic) 2202, electrodes 2204, insulator 2206, water 2208 and oil 2210.

Figure 23:
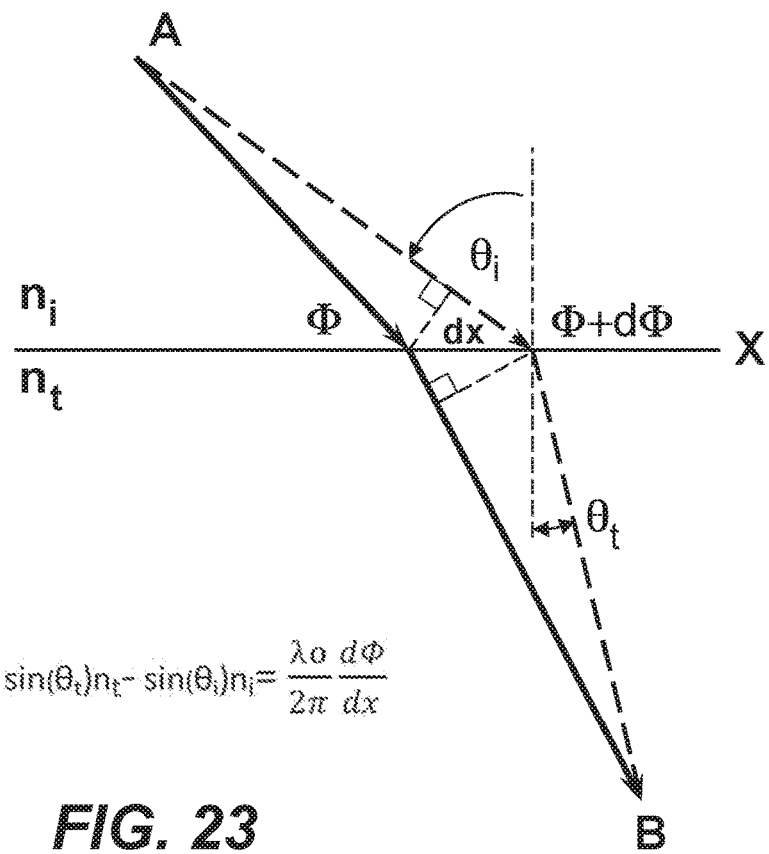
FIG. 23 depicts the refractive effects for advanced optics comprising nano-antennas.

In another embodiment, FIG. 23 depicts the refractive effects of the advanced optics comprising nano-antennas, such as described in the Yu article mentioned above. In one embodiment, the display is integrated with a substrate which comprises of an array of nano-antennas designed to introduce an abrupt phase shift in the light path. $\Phi$ and $\Phi+n\Phi$ are the phase shifts where the two paths (ordinary and anomalously refracted light) cross the boundary between two media. As shown, the amount of phase shift is a function of the position along the interface.

Phase shifts may be achieved when a light wave hits the surface of the antenna array which may be built from highly conductive materials occupying trenches etched in silicon substrate. The varied geometries of the antenna determine the level of incident, scattering and refractive electric fields.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A personal display system comprising:
    a frame, said frame formed to fit and mount the head of a viewer;
    at least one optical piece attached to said frame, said at least one optical piece comprising at least a portion of a plurality of active emissive elements; and
    a plurality of side pieces including at least one side piece for holding the frame on the head of the viewer, said at least one side piece being mechanically attachable to and detachable from said frame and electrically attachable to said frame,
    wherein said at least one side piece comprises components for processing and/or for communications of image data for display by said optical piece,
    wherein each of said plurality of side pieces has a particular function, wherein said at least one side piece is selectable by said viewer from said plurality of side pieces in order to select said particular function, and wherein said at least one side piece is mechanically attachable to and detachable from said frame by said viewer in order to select said particular function for said personal display system,
    wherein said at least one side piece comprises a flex circuit and a hinge, wherein said flex circuit extends from said at least one side piece around said hinge,
    wherein said flex circuit provides electrical connection to said frame and provides durability to bending stress,
    wherein said hinge provides mechanical connection to said frame whereby said at least one side piece is movable between a first position and a second position, wherein said at least one side piece is in said first position when said at least one side piece is mechanically attached to said frame and said personal display system is wearable by said viewer, and wherein said at least one side piece is in said second position when said at least one side piece is mechanically attached to said frame and said at least one side piece is flexed for compact storage of said personal display system,
    wherein said particular function is one of a plurality of particular functions, wherein said plurality of particular functions includes an image processing function, a wireless communications function, a night vision function, and a gaming function,
    wherein a first side piece implements a first function of said plurality of particular functions, wherein a second side piece implements a second function of said plurality of particular functions that differs from said first function, and
    wherein when said first side piece is attached to said frame, said first side piece configures said personal display system to implement said first function, and wherein when said second side piece instead of said first side piece is attached to said frame, said second side piece configures said personal display system to implement said second function.

2. The personal display system as recited in claim 1 wherein said personal display system further comprises: a front piece, said front piece comprising a transmissive portion; and wherein said front piece is capable of being mated to said frame.

3. The personal display system as recited in claim 2 wherein said transmissive portion comprises one of a group, wherein said group comprises a polarization feature and a spectral separation feature.

4. The personal display system as recited in claim 3 wherein said transmissive portion is capable of transmitting images of real world objects to the viewer and said active emissive elements are capable of producing virtual images to the viewer.

5. The personal display system as recited in claim 1 wherein at least two optical pieces are provided, which further comprise a transmissive portion that is capable of transmitting images of real world objects to the viewer and wherein said active emissive elements are capable of producing virtual images to the viewer.

6. The personal display system as recited in claim 5 wherein said transmissive portion comprises one of a group, said group comprises a polarization feature and a spectral separation feature.

7. The personal display system as recited in claim 1 wherein said at least one side piece comprises a housing, said housing comprising said flex circuit and a plurality of said components.

8. The personal display system as recited in claim 1 wherein said plurality of active emissive elements comprises one of a group, said group comprising: OLED elements, Transmissive OLED elements and quantum dot elements.

9. The personal display system as recited in claim 1 wherein said display system further comprises: a communications component, said communications component capable of receiving data from an external source to affect a presentation of virtual images to the viewer.

10. The personal display system as recited in claim 1 wherein said display system further comprises at least one optical element, said optical element placed in the optical path of the viewer and said optical element capable of affecting LEEP optical effects.

11. The personal display system as recited in claim 10 wherein said at least one optical element comprises a series of optical lenses.

12. The personal display system as recited in claim 10 wherein said at least one optical element comprises a fluid based optical element.

13. The personal display system as recited in claim 12 wherein said fluid based optical element comprises a chamber for holding at least one fluid and an actuator, said actuator changing the shape of said chamber to affect a change in the optical characteristics of said optical element.

14. The personal display system of claim 1 wherein said display system further comprises: eyetracking components, said eyetracking components mated to said frame and said eyetracking components comprising: a light, said light illuminating the viewer's eye and said light being kept outside a cone of vision of said viewer; and an image sensor, said image sensor detecting light reflected from said viewer's eye and said light detector sending signals to a processing component that correlates to the area of field of vision upon which the viewer is focused.

15. The personal display system of claim 1, wherein said at least one side piece further comprises a connector;
    wherein said frame comprises a slot; and
    wherein said connector and said slot provide mechanical attachment to and detachment between said at least one side piece and said frame.

16. The personal display system of claim 1, wherein said flex circuit is a polyimide-based flexible interconnecting circuit.

17. The personal display system of claim 1, wherein said flex circuit is a polyimide-based flexible interconnecting circuit fabricated by laser direct structuring.

* * * * *